United States Patent [19]

Downey et al.

[11] Patent Number: 5,425,224
[45] Date of Patent: Jun. 20, 1995

[54] MOWER DECK CARRIAGE

[76] Inventors: Sam Downey, 4881 Dilly Shaw Rd.;
Luke Dileo, 1632 Reed Rd., both of
Bryan, Tex. 77808

[21] Appl. No.: 287,258

[22] Filed: Aug. 8, 1994

[51] Int. Cl.⁶ .......................................... A01D 34/00
[52] U.S. Cl. ................................................. 56/15.8
[58] Field of Search .......................... 56/14.7–15.8, 56/13.5, 12.7

[56] References Cited

U.S. PATENT DOCUMENTS

| | | | |
|---|---|---|---|
| 3,680,292 | 8/1972 | McCane | 56/15.8 |
| 4,869,057 | 9/1989 | Siegrist | 56/15.8 |
| 5,029,437 | 7/1991 | Dobberpuhl | 56/15.8 |
| 5,060,462 | 10/1991 | Helfer et al. | 56/15.3 |

Primary Examiner—Michael Powell Buiz
Attorney, Agent, or Firm—The Keeling Law Firm

[57] ABSTRACT

A mower deck carriage for mounting a mower deck on a vehicle such as a mower or tractor, including laterally aligned, spaced channels attached to the upper side of the mower deck, a suspension frame attached to the vehicle, the suspension frame supporting a plurality of laterally aligned, spaced rollers, the rollers received in the channels. The mower deck channels are laterally moveable along the spaced rollers. A spring attached between the mower deck and the vehicle biases the mower deck in a preferred position. A mower deck guard extends exterior of the mower deck. The roller guard, the channels, the rollers and the spring allow lateral movement of the mower deck upon encountering a fixed object such as a tree or fence post.

20 Claims, 3 Drawing Sheets

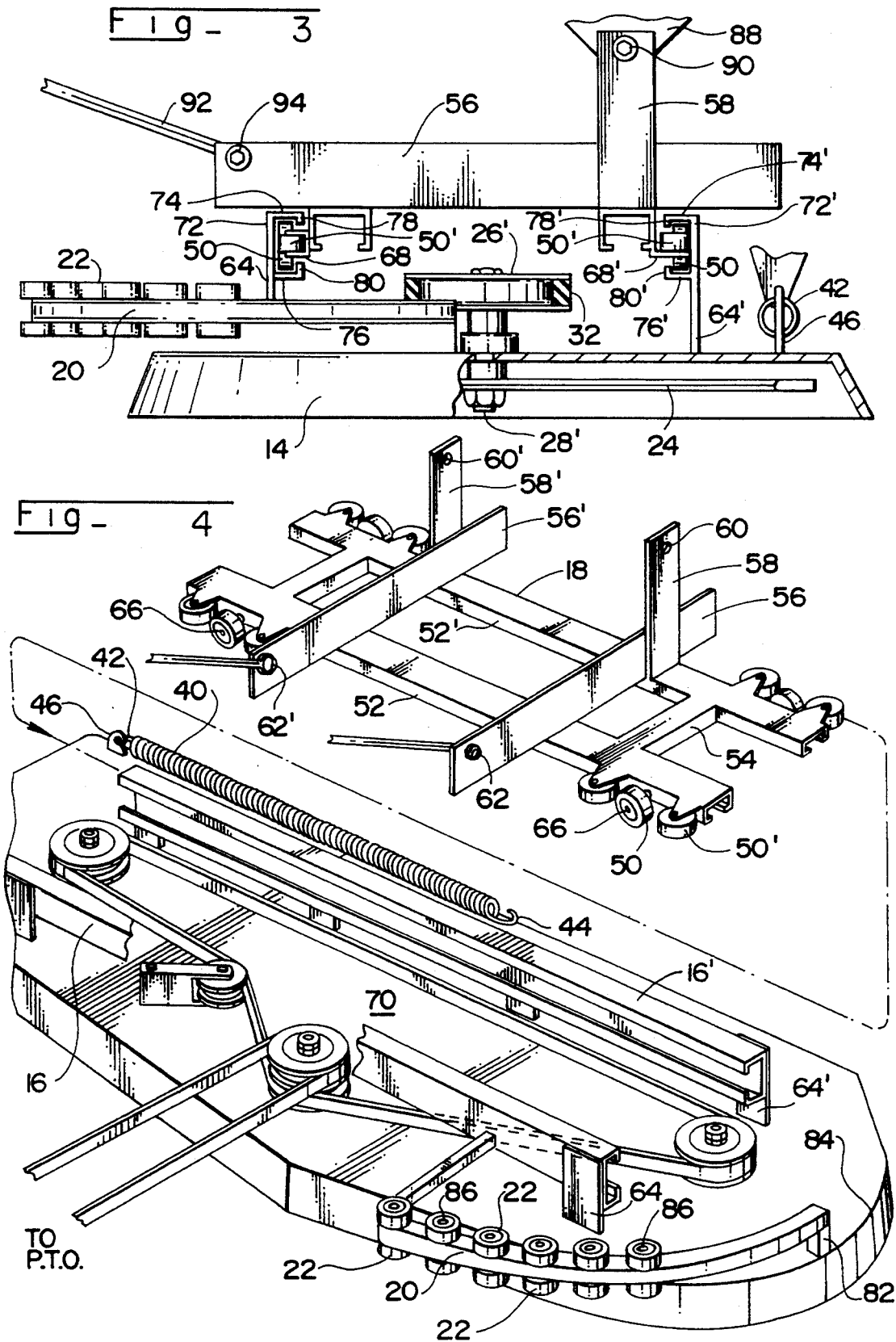

MOWER DECK CARRIAGE

FIELD OF THE INVENTION

The present invention relates to the field of mowers and more particularly to an improved mower deck carriage.

BACKGROUND OF THE INVENTION

Riding mowers are commonly used for mowing large lawns and grassy areas. Riding mowers often are constructed with a mower deck suspended below the mower body intermediate the front and rear wheels. Mower decks for installation on conventional tractors are often constructed to be suspended below the tractor body intermediate the front and rear wheels as on riding mowers.

Mower decks typically include a housing fixedly mounted to the tractor frame with means often provided to raise and lower the mower deck. One or more mower blades are suspended below the housing. Power transfer means are provided between the motor and the blade or blades. Such power transfer means often comprises a belt drive.

Riding mowers and tractor-mounted mowers are typically designed such that the mower blade and thus the housing extend laterally exterior of the wheels of the tractor or mower to provide a cutting swath at least as wide as the lateral width of the wider wheel set.

It is difficult to cut around objects such as trees and fence posts with riding mowers and tractor-mounted mowers due to the size, maneuverability and structure of the mower or tractor. Areas adjacent objects such as trees, fence posts and the like are often mowed with hand mowers or edgers, or left unmowed.

Mower decks for riding mowers and tractors are typically bolted to the underside of the tractor. To access the mower deck for blade sharpening, cleaning and greasing, it is generally necessary to detach the mower deck from the tractor, perform the sharpening, cleaning or greasing, and reinstall the mower deck by bolting it to the tractor, requiring that it be lifted to be reattached.

Parish U.S. Pat. No. 4,672,799 discloses a riding mower side guard adapted to move relative to the housing when the guard contacts a stationary object.

Hill U.S. Pat. No. 5,003,757 discloses a lawn mower discharge deflector horizontally and vertically pivotable in response to contact with objects.

McKeever U.S. Pat. No. 4,996,832 discloses a side guard for a lawn mower. Other patents relating to mowers or attachments include Lowry et al. U.S. Pat. No. 4,428,183, Ryken et al. U.S. Pat. No. 5,203,150 and Anderson et al. U.S. Pat. No. 4,677,814.

Presently practiced riding mowers and tractor mounted mowers do not provide adequate means for mowing areas immediately adjacent objects such as trees, fence posts and like stationary objects.

It is therefore an object of the present invention to provide a riding mower or tractor mounted mower providing means for effectively mowing areas adjacent trees, fence posts, and like objects.

It is a further object of the present invention to provide a mower deck for attachment to riding mowers and tractor mounted mowers, the mower deck laterally adjustable in relation to the mower or tractor.

It is a further object of the present invention to provide a mower deck which is laterally adjustable responsive to objects encountered during mowing.

It is a further object of the present invention to provide a mower deck which may be readily attached to and detached from the tractor.

The foregoing and other objects of the present invention are accomplished by a mower deck carriage for mounting a mower deck on a mower or tractor including laterally aligned, spaced channels attached to the upper side of the mower deck, the mower deck suspended from aligned, spaced rollers receivable in said channels, which rollers are attached to the tractor. The mower deck channels are laterally moveable along the spaced rollers. Springs are attached between the mower deck and the tractor to bias the mower deck in a preferred position. A mower deck guard extends exterior of the mower deck. Rollers are provided on the guard extending laterally therefrom to reduce friction at engagement of the guard with objects such as trees or fence posts. The roller guards, the channels, rollers and spring means cooperatively bias the mower deck in a preferred position and allow lateral movement of the mower deck upon encountering a fixed object such as a tree or fence post.

BRIEF DESCRIPTION OF THE DRAWINGS

FIG. 3 depicts a side view of the mower deck.

FIG. 4 depicts an isometric view of the mower deck support.

DETAILED DESCRIPTION OF THE INVENTION

Figure 1:
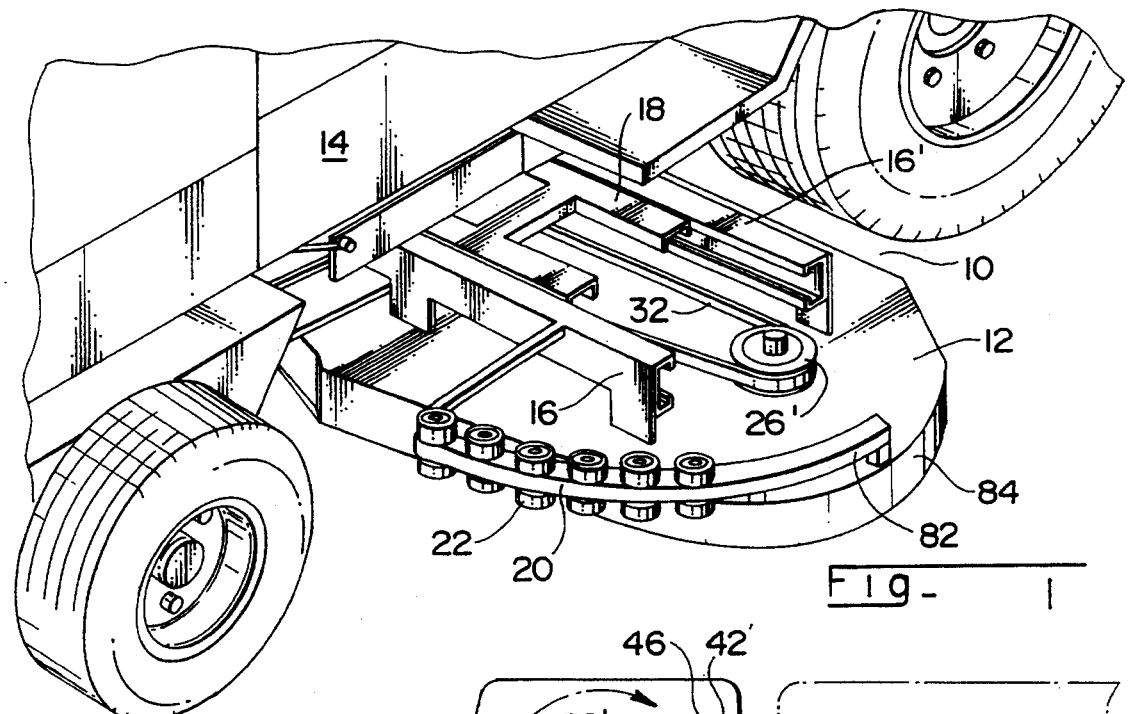
FIG. 1 depicts an isometric view of the mower deck of the present invention extending from a tractor.

Referring to FIG. 1, the mower deck carriage 10 of the present invention is depicted in relation to a mower deck 12 and a tractor 14. The mower deck carriage 10 includes channels 16 and 16' attached to the mower deck and roller assembly 18. The channels 16 and 16' receive rollers 50 and 50' (not shown in FIG. 1), which rollers 50 and 50' are supported on roller assembly 18. A guard rail 20 extends from the mower deck 12. The guard rail 20 supports guard rollers 22.

Figure 2:
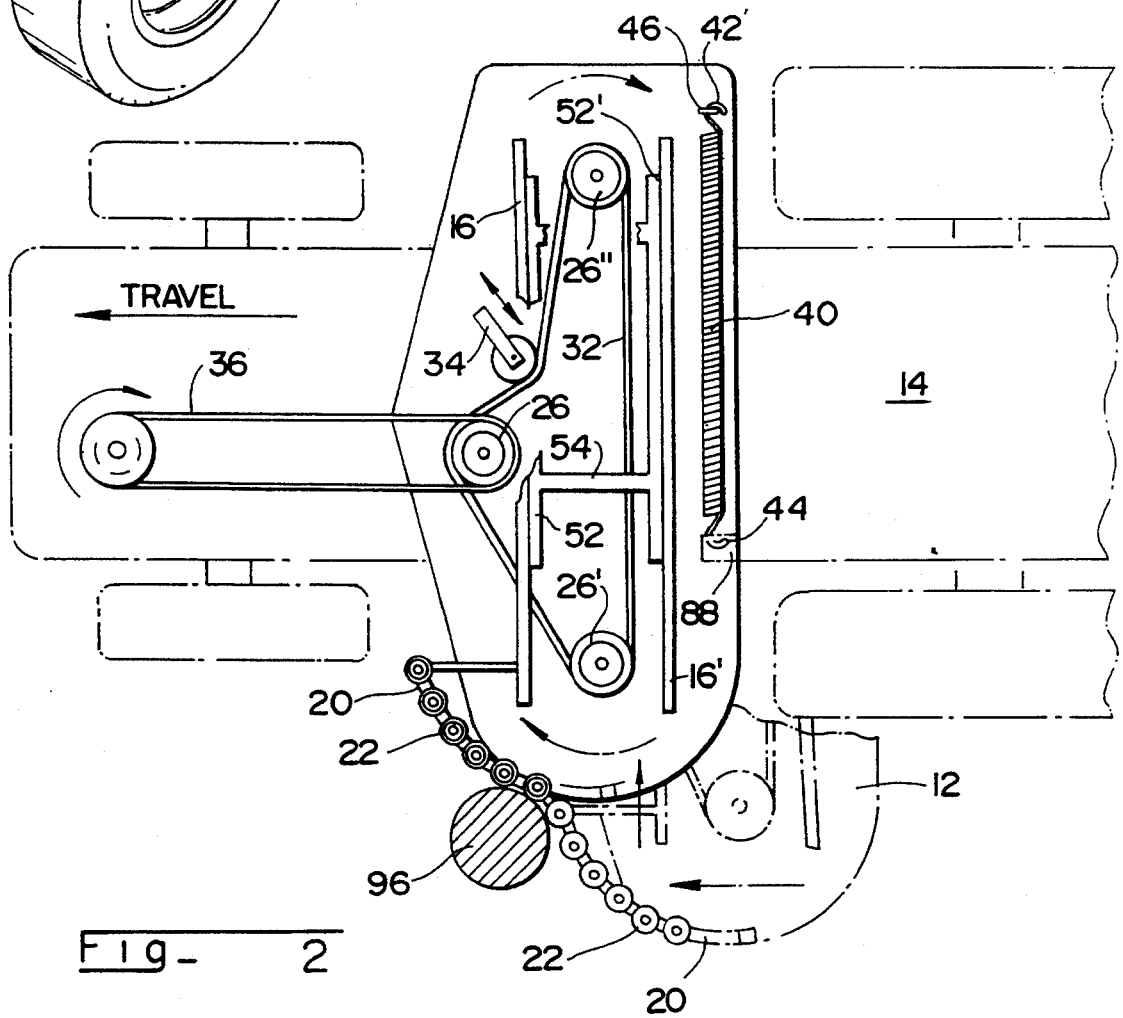
FIG. 2 depicts a plan view of the mower deck.

Referring to FIG. 2, a plan, cut-away view of the mower deck 12 is depicted. In the embodiment shown, three mower blade pulleys 26, 26' and 26" are supported on the mower deck 12. The mower blade pulleys 26, 26' and 26" are each connected through axles 28, 28' and 28" to mower blades 30, 30' and 30" (not shown in FIG. 2), the mower blades 30, 30' and 30" extending below the mower deck 12.

A pulley belt 32 extends around the blade pulleys 26, 26' and 26". A biasing pulley 34 is attached to the mower deck 12. The biasing pulley 34 includes spring means such that the biasing pulley 34 exerts a biasing force against the pulley belt 32. The biasing force maintains tension on pulley belt 32. As the biasing pulley 34 is a conventional, commercially-available pulley, details of construction of the biasing pulley 34 are not depicted. The blade pulleys 26, 26' and 26" are each rotatable around their respective axles 28, 28' and 28" by the pulley belt 32.

The blade pulley 26 comprises a double pulley. A power take-off pulley belt 36 is connected between the blade pulley 26 and a power take-off pulley 38. The power take-off pulley 38 is connected to the tractor 14 motor (not shown) by conventional means.

Still referring to FIG. 2, the channels 16 and 16' extend laterally in relation to the tractor 14. The channels 16 and 16' are longitudinally spaced. Roller support assembly 18 extends between the channels 16 and 16'.

Spring 40 extends laterally above deck 12. A first, hooked end 42 of spring 40 extends through deck attachment ear 46. Deck attachment ear 46 is fixedly attached to deck 12. A second, distal hooked spring end 44 is connected to the underside of tractor In the embodiment shown the spring end 44 is hooked through an opening 48 provided in a member 52 attached to tractor 14. The spring 40 normally biases the roller assembly 18 to a preferred lateral position within the channels 14 and 14', which biasing consequently biases the mower deck 12 to a preferred lateral position in relation to tractor 14.

Referring to FIG. 4, details of construction of the mower deck carriage 10 are depicted. The roller assembly 18 includes two aligned, laterally extending roller support members 52 and 52'. Two aligned, longitudinally extending cross members 54 and 54' are each fixedly attached, such as by welding, to the roller support members 52 and 52' The cross members 54 and 54' extend between the roller support members 52 and 52' and maintain the roller support members 52 and 52' in fixedly spaced relationship.

Two aligned, longitudinally extending horizontal bars 56 and 56' are each fixedly attached, such as by welding, to the roller support members 52 and 52'. The horizontal bars 56 and 56' extend above the roller support members 52 and 52'. Two aligned bars 58 and 58' extend upwardly from roller support member 52', each of the vertical bars 58 and 58' abutting support member 52' and each of the vertical bars 58 and 58' fixedly attached, such as by welding, to a corresponding horizontal bar 56 and 56'.

Bolt holes 60 and 60' are provided in the upper ends of each of vertical bars 58 and 58' Bolt holes 62 and 62' are provided at ends 64 and 64' of horizontal bars 56 and 56' distal from vertical bars 58 and 58'

Bolt holes 60 and 60' and bolt holes 62 and 62' are provided for attachment of the vertical bars 58 and 58' and horizontal bars 56 and 56', and consequently roller assembly 18 to the tractor 14.

A plurality of rollers 50 and 50' are attached to the roller support members 52 and 52'. Four vertically oriented rollers 50 are provided, each vertical roller 50 located near a lateral end of each of support members 52 and 52'. Each vertical roller 50 is attached longitudinally exterior of the support member 52 or 52' and is connected to the support member 52 or 52' by a roller axle 66. Two pairs of horizontally oriented rollers 50' are attached to support members 52 and two pairs of horizontally oriented rollers 50' are attached to support member 52'. A pair of horizontal rollers 50' is located near a lateral end of each of support members 52 and 52'. The pairs of horizontal rollers 50' are positioned such that a horizontal roller 50' is located laterally on each side of a vertical roller 50. Each horizontal roller 50' is attached longitudinally exterior of the support member 52 or 52' and is attached to the support member 52 or 52' by a roller bracket 68.

Still referring to FIG. 4, channel 16, depicted partially cut away, and channel 16' are positioned in laterally aligned, horizontal arrangement above the mower deck 14. Channel 16 is fixedly supported above the mower deck 12 by channel struts 64. Channel 16' is fixedly supported above the mower deck 12 by channel struts 64'. Channel struts 64 and 64' are fixedly attached, such as by welding, to the upper surface 70 of mower deck 14.

Channel 16 includes a back wall 72, an upper extension 74 and a lower extension 76. Each of upper extension 74 and lower extension 76 extends in the direction of channel 16' An upper lip 78 extends downwardly from upper extension 74 distal from back wall 72 and a lower lip 80 extends upwardly from lower extension 76 distal from back wall 72. In like manner channel 16' includes a back wall 72', an upper extension 74' and a lower extension 76' Each of upper extension 74' and lower extension 76' extends in the direction of channel 16. An upper lip 78' extends downwardly from upper extension 74' distal from back wall 72' and a lower lip 80' extends upwardly from lower extension 76' distal from back wall 72'.

The channels 16 and 16' are so constructed and arranged that rollers 50 and 50' are readily received therein. The roller axles 66 of the vertical rollers 50 extend through the openings between upper lips 78 and 78' and lower lips 80 and 80' with the vertical rollers 50 supported on lower extensions 76 and 76' and limited as to upward displacement by upper extension 74 and Referring to FIG. 3, the horizontal rollers 50' and roller brackets 68 extend through the openings between upper lips 78 and 78' and lower lips 80 and 80'. Longitudinal displacement of the mower deck 12 in relation to the roller assembly 18 is limited by the engagement of the rollers 50' with the back walls 72 and 72' of channels 16 and 16'.

Rollers 50 and 50' allow lateral movement of the mower deck 14 in relation to roller assembly 18 while restraining the mower deck 14 from vertical and longitudinal displacement in relation to the roller assembly 18.

Referring again to FIG. 4, spring 40 is attached at spring end 42 to deck attachment ear 46. Spring 40 extends generally laterally and upward from mower deck 12. The attachment of the distal spring end 44 is not depicted in FIG. 4.

Three mower blade pulleys 26, 26' and 26" are supported on the mower deck 12. The mower blade pulleys 26, 26' and 26" are each connected through axles 28, 28' and 28" to mower blades 30, 30' and 30", the mower blades 30, 30' and 30" extending below the mower deck 12. Pulley belt 32 extends around the blade pulleys 26, 26' and 26". Biasing pulley 34 is attached to the mower deck 12. The blade pulleys 26, 26' and 26" are each rotatable around their respective axles 28, 28' and 28" by the pulley belt 32. Power take-off pulley belt 36 is connected between the blade pulley 26 and a power take-off pulley 38 (not shown in FIG. 4).

The channel 16 is supported above the mower deck 12 by channel strut 64 allowing the pulley belt 32 to extend below the channel 16.

Still referring to FIG. 4, guard rail 20 is fixedly attached, such as by welding or bolting, to the mower deck 12. The guard rail 20 is constructed and positioned to extend forward of the mower deck 12 and to curve around the mower deck 12 to an attachment end 82 aligned with deck lateral end 84. A plurality of horizontal guard rollers 22 are attached to guard rail 20. Guard roller axles 86 extend vertically above and below guard rail 20. The guard rollers 22 are rotatably supported on the guard roller axles 86 with the rollers 22 extending outwardly from the guard rail 20.

Referring now to FIG. 3, a side view of the mower deck carriage 10 of the present invention is depicted. Mower blade 30' extends below the mower deck 12. Mower blade 30' is operationally connected to mower blade pulley 26' by axle 28'.

Guard rollers 22, supported on guard rail 20, extend forward of mower deck 12. Spring end 42 is depicted engaged with deck attachment ear 46.

Laterally aligned channels 16 and 16', depicted in end view, are supported on vertical rollers 50 and maintained in fixed longitudinal position by horizontal rollers 50' Vertical rollers 50 are supported on roller support members 52 and 52' by roller brackets 68 and 68' The roller support assembly 18 is supported on the underside of the tractor 14 in part by attachment of the vertical bars 58 to tractor attachment ear 88 located on the underside of the tractor 14 and by attachment of horizontal bar 56 to the underside of tractor 14 by attachment rod 92. The attachment rod 18 is attached to horizontal bar 56 at bolt 94. Referring to FIG. 4, the roller support assembly is further supported by vertical bar 58', and by attachment of horizontal bar 56' and attachment rod 92'.

Operation of the Invention

Referring to FIG. 2, the operation of the mower deck carriage 10 of the present invention is depicted. The spring 40 normally maintains the mower deck 12 in a preferred lateral position, depicted by broken lines, in relation to the tractor 14. Upon the mower deck 12 encountering during operation a fixed object such as the post 96, the guard rollers 22 supported on curved guard rail 20 protect the mower deck 12 from damage. Upon engagement of the guard rollers 22 with the post 96, longitudinal and lateral forces are exerted on the guard rollers 22 and the mower deck 12. As the mower deck 12 is in fixed longitudinal relationship with the tractor and as the mower deck 12 may move laterally, the mower deck 12 is laterally displaced by the post 96 to a second position identified in FIG. 2 by solid lines. Upon passing the post 96, the spring 40 again biases the mower deck 12 to the preferred lateral position.

In order to remove the mower deck 12 from the tractor 14 for blade sharpening, greasing, blade replacement or other activity, the spring 40 is detached from the mower deck 12 and the pulley belts 32 and 36 are detached from the pulleys 26, 26' and 26". The mower deck 12 may then be laterally pulled away from the tractor 14, the movement being facilitated by rollers 50 and 50'.

The present invention has been described and depicted with reference to a specific embodiment. It will be obvious to one skilled in the art that modifications and variations may be constructed without departing from the spirit and scope of the invention and the appended claims.

Figure 5:
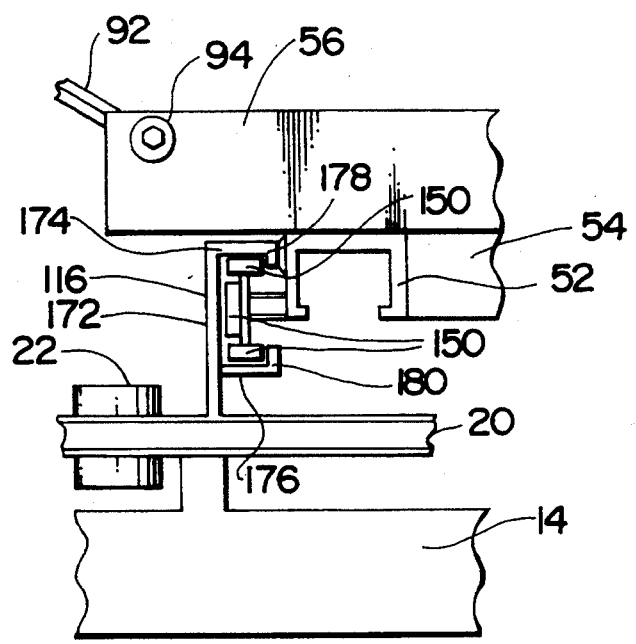
FIG. 5 depicts a detail of an alternative embodiment.

By way of example and not in limitation, other slidable means such as lubricated or self-lubricating members may be substituted for the rollers 50 and 50' and channels 16 and 16'. Referring to FIG. 5, an end view of a channel 116 of an alternative embodiment of the present invention is depicted together with a support member 152. In the alternative embodiment, sliding members 150 replace the rollers 50. Sliding members 150 are attached to the support member 52 by brackets 168. Channel 116, like channel 16 of the preferred embodiment includes a back wall 172. Upper extension 174 and lower extension 176 extend generally parallel and perpendicular to back wall 172. An upper lip 178 extends downwardly from upper extension 174 distal from back wall 172. Lower lip 180 extends upwardly from lower extension 176 distal from back wall 172. A plurality of sliding members 150 are attached to bracket 168. The sliding members 150 are slidably supported interior of the channel 116 between upper extension 174 and lower extension 176, and between back wall 172 and upper lip 178 and lower lip 180.

By way of further example, other biasing means may be substituted for the spring 40.

We claim:

1. A mower deck carriage for attachment of a mower deck to a vehicle, comprising:
    at least one laterally-extending deck support member attached to the mower deck;
    at least one suspension member attached to the vehicle and oriented to receive the deck support member;
    engagement means to support said at least one deck support member by said suspension member;
    said engagement means allowing lateral movement of said at least one deck support member in relation to said at least one suspension member;
    biasing means for biasing the said mower deck in a preferred first lateral position in relation to the vehicle;
    said biasing means allowing lateral displacement of said mower deck from said first lateral position responsive to external force.

2. A mower deck carriage according to claim 1 wherein:
    said at least one deck support member comprising two laterally-extending deck support members, said deck support members longitudinally spaced;
    said at least one suspension member comprising two suspension members extending laterally in relation to the vehicle, said suspension members longitudinally spaced;
    each of said deck support members supported by a suspension member and laterally moveable in relation to the suspension member.

3. A mower deck carriage according to claim 1 wherein:
    said engagement means including a plurality of rollers attached to one of said at least one deck support member or said at least one suspension member; and
    said engagement means further including at least one channel in the other of said at least one deck support member or said at least one suspension member to receive said rollers.

4. A mower deck carriage according to claim 1 wherein:
    said engagement means including a plurality of rollers attached to said at least one deck support member;
    said plurality of rollers supported by said suspension member and in rolling engagement with said suspension member;

5. A mower deck carriage according to claim 1 wherein:
    said engagement means including at least two cooperative sliding members, one of said at least two sliding members attached to said deck support member and the other of said at least two sliding members attached to said suspension member.

6. A mower deck carriage according to claim 1 wherein:
said engagement means including at least one channel in one of said at least one deck support member or said at least one suspension member; and
said engagement means further including at least one sliding member attached to the other of said at least one deck support member or said at least one suspension member.

7. A mower deck carriage according to claim 1 wherein:
said biasing means comprising a spring attached to said mower deck and distally attached to said vehicle.

8. A mower deck carriage according to claim 1 wherein:
a deck guard provided exterior of said mower deck.

9. A mower deck carriage according to claim 1 wherein:
guard rollers attached to said deck guard;
said guard rollers extending outwardly of said deck guard.

10. A mower deck carriage according to claim 8 wherein:
said mower deck laterally displaceable from said first lateral position upon a sufficient longitudinal or lateral force applied to said deck guard.

11. A mower deck carriage for attachment of a mower deck to a vehicle, comprising:
at least one deck support member attached to the mower deck;
said at least one deck support member extending laterally in relation to the vehicle;
a suspension frame attached to the vehicle and oriented to receive said at least one deck support member;
said at least one deck support member supported by said suspension frame;
said at least one deck support member laterally moveable in relation to said suspension frame;
biasing means for biasing said mower deck in a preferred first lateral position in relation to said vehicle;
said biasing means allowing lateral displacement of said mower from said first lateral position responsive to external force applied to said mower deck.

12. A mower deck carriage according to claim 11 wherein:
said at least one deck support member supported on said suspension frame by rollers engaging roller support means;
said rollers including vertically-oriented rollers and further including horizontally-oriented rollers;
whereby said at least one deck support member is restrained to limited vertical and longitudinal movement in relation to said suspension frame by said vertically-oriented and horizontally-oriented rollers.

13. A mower deck carriage according to claim 11 wherein:
said at least one deck support member comprising two laterally-extending deck support members, said deck support members longitudinally spaced;
said suspension frame including two suspension members, said suspension members extending laterally in relation to the vehicle, said suspension members longitudinally spaced;
each of said deck support members supported by a corresponding suspension member and laterally moveable in relation to said corresponding suspension member.

14. A mower deck carriage according to claim 13 wherein:
each of said deck support members supported on a corresponding suspension member by rollers attached to one of said deck support members or said suspension members; and
said rollers supported on the other of said deck support members or said suspension members.

15. A mower deck carriage according to claim 13 wherein:
a plurality of rollers attached to said deck support members;
said suspension members each including a laterally-extending channel;
said plurality of rollers supported by said suspension members in said channels and said rollers rolling in said channels.

16. A mower deck carriage according to claim 13 wherein:
said rollers including vertically-oriented rollers;
whereby said deck support members are restrained to limited vertical movement in relation to said suspension members by engagement of said vertically oriented members with said channels.

17. A mower deck carriage according to claim 13 wherein:
said rollers including horizontally-oriented rollers;
whereby said deck support members are restrained to limited longitudinal movement in relation to said suspension members by said horizontally-oriented rollers.

18. A mower deck carriage according to claim 13 wherein:
said biasing means comprising a spring attached to said mower deck and distally attached to said vehicle.

19. A mower deck carriage according to claim 18 wherein:
a curved guard provided exterior of said mower deck;
rollers attached to said curved guard;
said rollers extending outwardly of said curved guard.

20. A mower deck carriage according to claim 11 wherein:
said engagement means including at least one channel in one of said at least one deck support member or said suspension frame; and
said engagement means further including at least one sliding member attached to the other of said at least one deck support member or said suspension frame.

* * * * *